Figure 5:
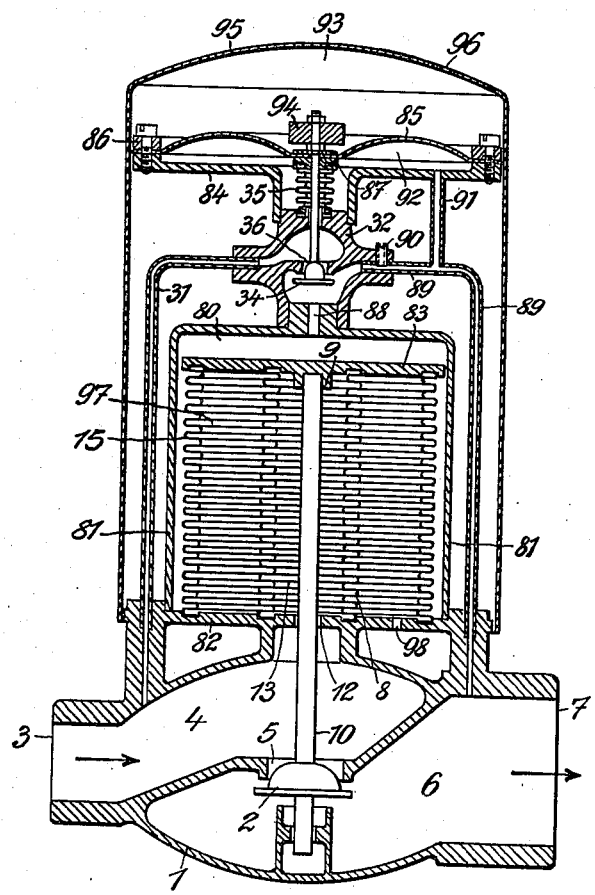

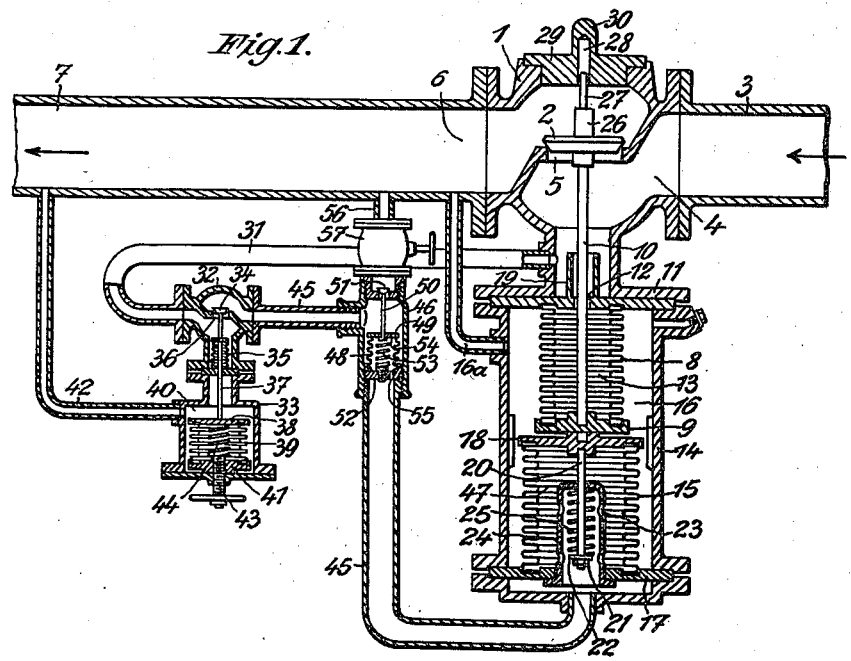
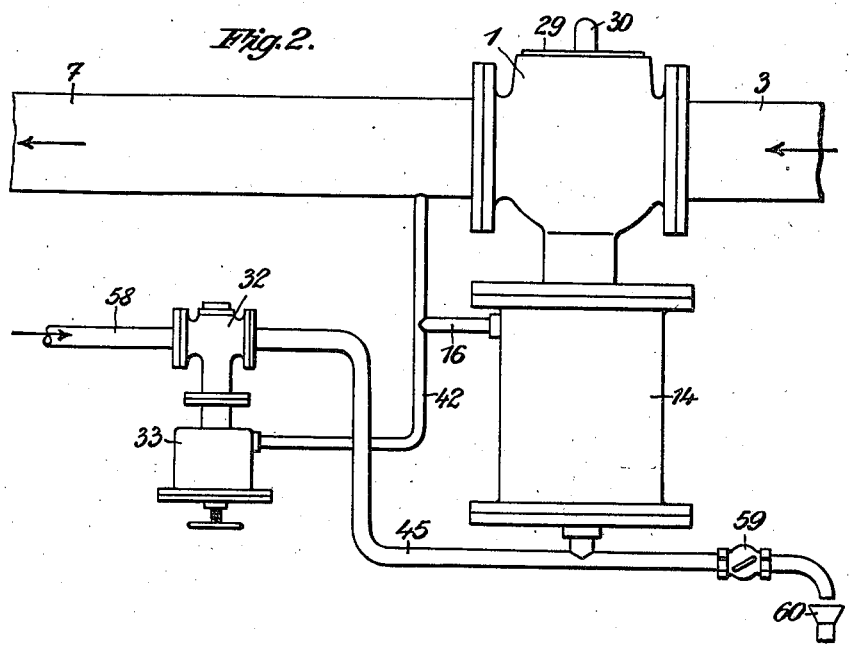

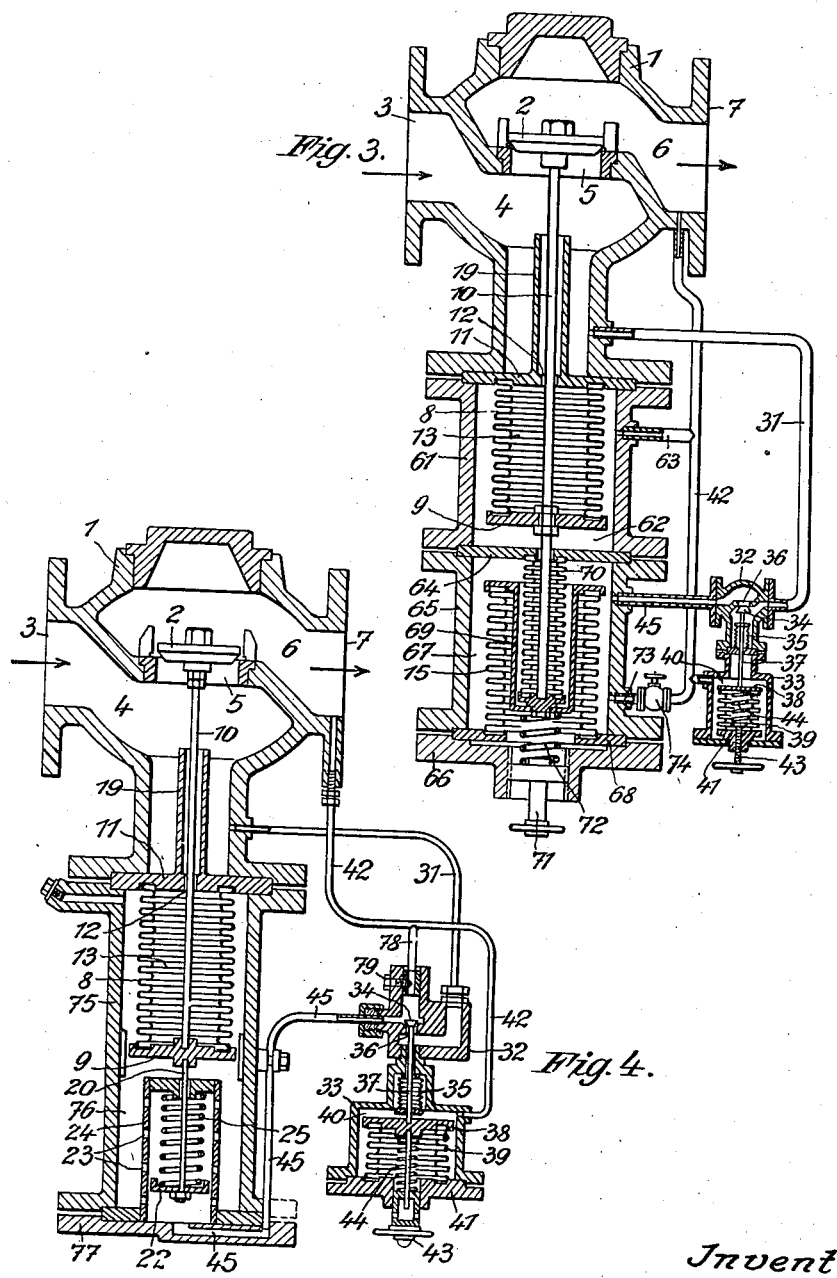

Sept. 10, 1935.　　　H. SANDVOSS　　　2,013,766
PRESSURE REGULATOR
Filed May 26, 1934　　　3 Sheets-Sheet 3

Inventor:
Hermann Sandvoss

Patented Sept. 10, 1935

2,013,766

UNITED STATES PATENT OFFICE 2,013,766

PRESSURE REGULATOR

Hermann Sandvoss, Osthafen, Frankfort-on-the-Main, Germany

Application May 26, 1934, Serial No. 727,829
In Germany April 18, 1933

16 Claims. (Cl. 50—10)

This invention relates to a pressure regulator or pressure reducer, in which a main regulating valve is controlled by an auxiliary regulating valve.

The main object of the invention is to provide a pressure regulator possessing greater sensitiveness and accuracy in operation than the existing types of this class.

The main feature of the invention is to connect a main pressure regulator, whose pressure responsive member controlled by the auxiliary regulator is formed by a bellows and whose single seat valve is relieved by a balancing pressure responsive device with an auxiliary regulator whose pressure responsive member is influenced by the reduced pressure and formed by a bellows and whose single seat valve is likewise relieved by a balancing pressure responsive device.

By way of example, the invention is illustrated in the accompanying drawings, in which Figure 1 is a sectional view of a pressure regulator according to the invention; Fig. 2 is an elevation of another constructional form of a pressure regulator; and Figs. 3, 4 and 5 are sectional views of three other embodiments of the invention.

Referring to the drawings, I is the flow valve of a main pressure regulator having a single seat cone 2. The medium to be regulated, e. g., steam or gas, flows in the direction of the arrow through the supply pipe 3 into the high pressure space 4 of the main pressure regulator, passes through the valve opening 5 into the reduced pressure space 6 and is discharged through the pipe 7.

The single seat cone 2 is fully relieved by the bellows 8 whose bottom plate 9 is connected with the valve rod 10 of the single seat cone 2, as the internal width of the bellows 8 is the same as that of the valve opening 5.

As shown in Fig. 5, the internal width of the bellows 8 may be greater than that of the valve opening 5, so that the single seat cone 2 will be firmly pressed onto its seat by the high pressure produced.

The balancing bellows 8 is secured to a cover 11 whose aperture 12 is for the purpose of bringing the inner space 13 of the bellows 8 into communication with the high pressure space 4. The bellows 8 packs the valve rod 10 which passes through the aperture 12 against leakage without requiring separate stuffing boxes for the rod. The cover 11 is provided with a neck 19 to prevent the passage of dirt into the inside of the bellows 8.

The bellows 8 is arranged in a casing 14 which, according to Fig. 1, contains in its lower portion a bellows 15. The balancing bellows 8 and bellows 15 are thus disposed in the same space 16 which is in communication with the reduced pressure space 6 of the main regulator through the conduit 16a. The bellows 15 is provided at one end in the bottom 17 of the casing 14 and, its other end, is provided with a tightly fitting bottom plate 18 which is connected with the bottom plate 9 of the bellows 8.

The cover 18 of the bellows 15 is connected with a rod 20 carrying at its lower end a disc 22 resting on the nut 21. The bottom plate 17 of the casing 14 is connected with a pipe 24 having the apertures 23, and between the disc 22 and the upper bent end of the pipe 24 a spring 25 is placed for drawing the single seat cone 2 onto its seat and thus insuring seating of the main valve 1. The spring 25 may be replaced by a weight suitably connected with the rod 20.

The valve stem 10 of the single seat cone 2 has at its top end a pin 27 provided with a collar 26 and guided in a bore 28 of the cover 29 shutting off the main valve 1 on top and acting as a stop for the collar 26 during the upward motion of the valve stem 10. A regulating screw, not shown, may be provided in the cover 29 at 30 to control the length of the stroke of the valve rod 10.

The high pressure space 4 of the main regulator is connected by the conduit 31 with the control valve 32 of a small auxiliary pressure regulator 33. The control valve 32 possesses a single seat cone 34, which, like the single seat cone 2 of the main valve 1, is balanced by a bellows 35 whose internal width corresponds to that of the valve passage 36. The valve rod 37 of the single seat cone 34 packed by the bellows 35 is connected with the bottom plate 38 of a bellows 39 which is arranged in an auxiliary impulse space 40 of the small auxiliary pressure regulator 33 and provided in the bottom plate 41 of the latter. The auxiliary impulse space 40 is in communication with the reduced pressure space 6 of the main regulator by the conduit 42. Inside the bellows 39 a regulating spring 44 is disposed which can be adjusted by a spindle 43 and which acts against the bottom plate 38 of the bellows 39.

The outlet side of the control valve 32 is connected with an impulse pressure piping 45 which, as shown in Fig. 1, leads into a transmission valve 46 and then into the main impulse space 47 formed in this construction by the inner space of the main bellows 15. The transmission valve 46 consists of a bellows 48 whose movable top plate 49 is connected by a valve rod 50 with a valve cone 51 whereas the lower bottom plate 52 is secured within the valve 46. An adjustable regulating spring 53 may be disposed in the bellows 48. The two plates 49 and 52 are provided with openings 54 and 55, so that the fluid under pressure entering the transmission valve 46 can enter at a prescribed speed through the connecting portion of the pressure piping 45 from the main impulse space 47. The valve cone 51 opens and closes a conduit 56 leading into the reduced pressure space 6 and possessing an interposed adjustable throttle valve 57 which serves for facilitating the escape of the excess pressure prevailing in the main impulse space 47 and the impulse pressure piping 45 at regulatable speed to the reduced pressure space 6.

The casing 14 of the pressure regulator as well as the impulse space 47 with the impulse pressure piping 45, particularly in steam operated plants, can always be filled with water up to the transmission valve 46, so that the impulse space 47 will be under pressure at the slightest opening of the single seat cone 34 of the small auxiliary pressure regulator 33. The water, which can be continually supplemented by the condensate, acts not only as a pressure transmitting medium, but protects also the bellows against injurious direct contact with the steam.

The construction shown in Fig. 2 differs from the one illustrated in Fig. 1 only in so far as the high pressure used as impulse force in the latter embodiment is replaced by pressure water which can flow through a piping 58 and an auxiliary regulating valve 32 into the impulse pressure piping 45 and into the impulse space 47. After the regulating operation has been finished, the excess pressure water can run off freely by means of a cock 59 and a funnel 60.

The pressure reducer shown in Fig. 1 functions as follows:

The medium to be regulated, e. g., steam, enters the main valve 1 through the supply conduit 3 in the direction of the arrow. In the valve 1, the steam exerts pressure under the single seat cone 2 and upon the bottom plate 9 of the bellows 8. If the pressure in the reduced pressure space 6 drops during operation below a certain degree, this drop in pressure will be transmitted by the conduit 42 to the auxiliary impulse space 40 of the small auxiliary regulator 33 with the result that under the influence of the regulating spring 44, which acts upon the plate 38 of the auxiliary bellows 39 and can be easily adjusted by the spindle 43, the balanced cone 34 of the auxiliary valve 32 will be opened. The pressure prevailing in the high pressure space 4 of the main regulating valve 1 will thus be transmitted through the pipe 31, the valve passage 36 and the impulse pressure piping 45 connected with the auxiliary valve 32 to the transmission valve 46. The high pressure acting on the plate 49 of the bellows 48 will compress the latter, so that the valve cone 51 is drawn onto its seat and thus the piping 56 shut off. The fluid under high pressure passes then through the openings 54 and 55 of the plates 49 and 52 at a prescribed speed into the connecting portion of the impulse pressure piping 45 and into the impulse space 47 of the main regulator, i. e., into spaces filled completely with water. This causes expansion of the main bellows 15 and, simultaneously, compression of the bellows 8, and the valve stem 10 will be lifted so as, with its collar 26, to remain close to the cover 29 of the main valve 1 to bring about complete opening of the valve opening 5.

If the pressure in the space 6 increases again very slightly, this increase in pressure will be transmitted through the piping 42 to the bellows 39 of the auxiliary regulator 33 and cause compression of the bellows 39 against the action of the regulating spring 44, so that the valve cone 34 will be drawn to its seat and thus stop the working pressure. Owing to the absence of this pressure and to the counter-pressure exerted by the spring 25 in the main regulator, the bellows 48 in the transmission valve 46 will be expanded whereby the valve cone 51 will be lifted from its seat and the overpressure prevailing in the main impulse space 47 and in the impulse pressure piping 45 can escape to the reduced pressure space 6. The escape of this overpressure can be controlled by adjusting the throttle valve 57 in such a way that the escape takes place quickly or slowly and the opening or closing of the main regulating valve 1 by the single seat cone 2 can be effected accordingly.

Fig. 3 shows another simplified form of the invention, the chief feature of which is that the impulse bellows and the balancing bellows of the regulator are disposed in two separate spaces, the first space serving as impulse space for the bellows and the second space as compensating space for the bellows.

In this construction, the main valve 1 and the small auxiliary regulating valve 33 are similar to those of the regulator according to Fig. 1, but the single seat cone 34 of the auxiliary valve 32 is arranged so that the passage 36 will be opened when the bellows 39 is compressed owing to an increase in pressure in the reduced pressure space 6 of the main regulator, which is transmitted by the conduit 42 to the auxiliary impulse space 40.

The balancing bellows 8 of the main regulator is disposed in a special compensating space 62 surrounded by the casing 61 and in communication with the conduit 42 leading into the reduced pressure space 6 by means of a compensating pipe 63. The relief thus provided for prevents the single seat cone from being held in closed position by the pressure prevailing in the space 6.

By means of an interposed plate 64 a second casing 65 having a lower bottom plate 66 is disposed under the casing 61. The impulse space 67 surrounded by the casing 65 contains the bellows 15 whose lower portion is packed into an inserted ring 68 and whose top is shut off by a tightly fitting, inwardly drawn in plate 69. The valve rod 10 passes through the plate 64 and is connected with the plate 69. A bellows 70, which is packed on top into the plate 64 and below into the plate 69, tightly shuts the compensating space 62 from the impulse space 67.

To effect adjustment of the main regulator a regulating spring 72 adjustable by means of a threaded spindle 71 may act on the plate 69 of the bellows 15, though the spring may also be omitted, since the members 8, 15 and 70, owing to their elasticity, constantly tend to fully open the single seat cone 2. The small auxiliary regulator 33 can be adjusted to any pressure by the regulating spring 44 and the screw spindle 43.

The compensating space 62 and the impulse spaces 67 and 40 of the regulators are continually filled with water when used in connection with steam plants. The impulse space 67 is connected with the auxiliary valve 32 by the impulse pressure piping 45 and with the reduced pressure space 6 by a conduit 73 opening into the piping 42. The conduit 73 is provided with a regulating valve 74.

The device according to Fig. 3 operates as follows:

A decrease of pressure in the reduced pressure space 6 is transmitted by the conduit 42 to the auxiliary impulse space 40, whereupon the bellows 39 will be pressed up by the spring 44 and the auxiliary valve 32 closed by the single seat cone 34. The excess pressure prevailing in the main impulse space 67 escapes at a speed that can be regulated by the valve 74 through the conduit 42 to the reduced pressure space 6. Owing to the compensation of pressure effected, the valve stem 10 will be raised by the members 8, 15, 70 or by the spring 72 and the cone 2 will open the main valve 1. If an increase in pressure takes place again in the reduced pressure space 6, the auxiliary bellows 39 in the auxiliary impulse space 40 will be depressed and the valve passage 36 opened, in consequence whereof the pressure will be transmitted from the high pressure space 4 through the piping 31, the auxiliary valve 32 and the conduit 45 to the main impulse space 67 and depress the plate 69 of the bellows 15 whereby the single seat cone 2 will be drawn against the direction of flow onto its seat and the main valve 1 tightly shut off.

A further and essentially simplified form of a pressure regulator suited particularly for high preliminary pressure is shown in Fig. 4. In this embodiment of the invention the balancing and impulse bellows form a single unit disposed in a space forming the impulse chamber.

For this purpose the balancing bellows 8 of the main regulator is built into a casing 75 surrounding the main impulse space 76. As in the construction shown in Fig. 1, the valve stem 10 is drawn down by the spring 25 arranged in the lower portion of the casing 75, so that the single seat cone 2 will engage its seat.

Through the plate 77 of the casing 75 passes the impulse pressure piping 45 connecting the impulse space 76 with the auxiliary valve 32. In the upper part of the auxiliary valve a piping 78 having an internal throttle screw 79 branches off from the impulse pressure piping 45 and opens into the conduit 42 leading from the reduced pressure space 6 to the auxiliary impulse space 40. Otherwise, the auxiliary valve 32 is constructed similar to the one shown in Fig. 1.

The mode of operation of the pressure regulator according to Fig. 4 is also similar to that of the regulator shown in Fig. 1. When in the position of the members shown in Fig. 4 the pressure in the reduction space 6 decreases to a very slight extent, the auxiliary valve 32 will be opened and the pressure medium will flow into the main impulse space 76 whereby the bellows 8 and the valve stem 10 will be lifted and the main valve 1 opened. If the pressure in the reducing space 6 increases beyond the point adjustable by the spring 44 of the small auxiliary regulator 33, the auxiliary valve 32 will be closed again and the excess pressure will escape from the main impulse space 76 through the conduits 45, 78 and 42 to the space 6. The single seat cone 2 will be drawn down by the spring 25 and the valve opening 5 thus closed or throttled. If the cone 2 closes tightly, its tight position will be secured by the pressure prevailing in the space 6 and acting on the cone. At reopening of the auxiliary valve the high pressure entering the main impulse space 76 suffices for instantly lifting the plate 9 and opening completely the valve 1.

The construction shown in Fig. 5 is particularly suitable for high pressure gas plants operating for instance with nitrogen gas. It is of small dimensions, built into a closed casing and can thus be installed in dwelling houses without any danger.

The bellows 8 according to Fig. 5 is arranged inside the bellows 15 disposed in a space 80 forming the impulse chamber which is surrounded by a casing 81 placed on the main valve 1. The gas, which is partly under very high pressure, enters the main valve 1 at 3 and flows through the valve opening 5 into the pressure reduction space 6 in which a very low gas pressure of, say, 40 mm. water column is to be uniformly and continually kept for consumption.

The bellows 15 and the bellows 8 are at their lower ends provided in a plate 82 of the casing 81 and, at their upper ends, in a plate 83 with which the upper end of the valve stem 10 is connected. In this construction the inner width of the bellows 8 is preferably greater than that of the valve passage 5 to cause the high pressure when necessary to press the cone 2 firmly onto its seat.

On the casing 81 rests the auxiliary valve 32 whose single seat cone 34 is fully balanced by the bellows 35. The auxiliary valve 32 has a bolted plate 84 above which, especially at higher reduced pressure, a bellows, or, as indicated in Fig. 5, an impulse diaphragm 85 is arranged, the edge of the diaphragm being clamped between the plate 84 and a retention ring 86. The plate 87 of the bellows 35 is connected with the impulse diaphragm 85.

The high pressure space 4 is, by means of a conduit 31, in communication with the auxiliary valve 32 which, on the other side, is in communication with the main impulse space 80 by means of a pressure piping 88 and, with the pressure reduction space 6, by a conduit 89 with interposed regulating member 90. A piping 91 branching off from the conduit 89 leads into the auxiliary impulse space 92 in the bellows or below the impulse diaphragm 85. If necessary, the branched off piping 91 could also be in communication with the space 93 located above the diaphragm 85.

The pressure desired in the space 6 can be adjusted by adding or removing the weights 94 above the diaphragm 85 or the corresponding bellows, or it can be adjusted by a spring with regulating screw provided instead of the weights 94.

A protective covering 95 is disposed above the regulator parts and has an aperture 96 for connecting the space 93 with the outer air for compensation. The space 97 between the bellows 8 and the bellows 15 is also in communication with the outer air by means of an opening 98 in the plate 82.

The mode of action of this regulator is as follows: When the pressure in the space 6 decreases, the impulse diaphragm 85 or the corresponding bellows will be lowered owing to the decrease in pressure taking place also in the auxiliary impulse space 92. The auxiliary valve 32 opens and the high pressure passes through the conduits 31, 88 to the main impulse space 80 while overcoming the high pressure acting in the inner space 13 of the bellows 8 on the plate 83 and depressing the latter together with the valve stem 10 to close the main valve 1.

When normal pressure prevails in the pressure reduction space 6, the impulse diaphragm 85 will rise and close the auxiliary valve 32. Excess pressure in the main impulse space 80 escapes at a speed that can be regulated by the throttle screw 90 through the conduit 89 to the space 6 and the main valve 1 is firmly closed by the high pressure acting in the bellows 8 from below upon the plate 9.

I claim:—

1. A pressure regulator having a main regulator and an auxiliary regulator connected with and controlling said main regulator, each of said regulators comprising a bellows acting as impulse member, a single seat valve and a second bellows for balancing said valve.

2. A pressure regulator according to claim 1, in which the bellows of the main regulator are arranged in a common space.

3. A pressure regulator according to claim 1, in which the bellows of the main regulator are arranged in a common space, said space being in communication with the pressure reduction space of the main regulator, and in which the auxiliary valve connects the inside of the first-named bellows of the main regulator with the high pressure space of the main regulator, while the inside of the second-named bellows of the main regulator is directly in communication with the high pressure space of the main regulator.

4. A pressure regulator according to claim 1, in which the bellows of the main regulator are arranged in a common space, said space being in communication with the pressure reduction space of the main regulator, and in which the auxiliary valve connects the inside of the first-named bellows of the main regulator with the high pressure space of the main regulator, while the inside of the second-named bellows of the main regulator is directly in communication with the high pressure space of the main regulator, and a regulatable throttle member connects the inside of the first-named bellows of the main regulator with the pressure reduction space of the main regulator.

5. A pressure regulator according to claim 1, in which the bellows of the main regulator are arranged in a common space, said space being in communication with the pressure reduction space of the main regulator, and in which the auxiliary valve connects the inside of the first-named bellows of the main regulator with the high pressure space of the main regulator, while the inside of the second-named bellows of the main regulator is directly in communication with the high pressure space of the main regulator, a pressure responsive device interposed between the auxiliary valve and the inside of the first-named bellows of the main regulator, and a perforated movable plate and a perforated fixed plate forming part of said interposed pressure responsive device, said movable plate controlling a valve connecting the inside of the first-named bellows of the main regulator with the pressure reduction space of the main regulator.

6. A pressure regulator according to claim 1, comprising a common space for the bellows of the main regulator, the second-named bellows of the main regulator being concentrically disposed within the first-named bellows of the main regulator, the auxiliary valve connecting the space surrounding the first-named bellows of the main regulator with the high pressure space of the main regulator, and a regulatable throttle member for connecting the space surrounding the first-named bellows of the main regulator with the pressure reduction space of the main regulator, the inside of the second-named bellows of the main regulator being directly in communication with the high pressure space of the main regulator.

7. A pressure regulator according to claim 1, comprising a common space for the bellows of the main regulator, the second-named bellows of the main regulator being concentrically disposed within the first-named bellows of the main regulator, the auxiliary valve connecting the space surrounding the first-named bellows of the main regulator with the high pressure space of the main regulator, and a regulatable throttle member for connecting the space surrounding the first-named bellows of the main regulator with the pressure reduction space of the main regulator, the inside of the second-named bellows of the main regulator being directly in communication with the high pressure space of the main regulator, and the internal width of the second-named bellows of the main regulator being greater than the internal width of the passage of the main valve.

8. A pressure regulator according to claim 1, in which the bellows of the main regulator are disposed in two separate spaces.

9. A pressure regulator according to claim 1, in which the bellows of the main regulator are disposed in two separate spaces and a further bellows packs said spaces relative to one another.

10. A pressure regulator according to claim 1, in which the bellows of the main regulator are disposed in separate spaces, a further bellows for packing said spaces relative to one another, and in which the auxiliary valve connects the space containing the first-named bellows with the high pressure space of the main regulator, and an adjustable throttle member connecting the space containing the first-named bellows with the pressure reduction space of the main regulator.

11. A pressure regulator according to claim 1, in which the bellows of the main regulator are disposed in separate spaces, a further bellows for packing said spaces relative to one another, and in which the auxiliary valve connects the space containing the first-named bellows of the main regulator with the high pressure space of the main regulator, an adjustable throttle member connecting said space containing the first-named bellows of the main regulator with the pressure reduction space of the main regulator, and a compensating conduit connecting the space containing the second-named bellows of the main regulator with the pressure reduction space of the main regulator.

12. A pressure regulator according to claim 1, in which the bellows of the main regulator form a unit.

13. A pressure regulator according to claim 1, in which the bellows of the main regulator form a unit, a casing containing said unit, and in which the auxiliary valve connects said casing with the high pressure space of the main regulator, and a regulatable throttle member connecting said casing containing said unit with the pressure reduction space of the main regulator.

14. A pressure regulator according to claim 1, comprising an adjustable regulating spring acting on the first-named bellows of the auxiliary regulator.

15. A pressure regulator according to claim 1, comprising an adjustable regulating spring acting on the first-named bellows of the auxiliary regulator and a second adjustable regulating spring acting on the first-named bellows of the main regulator.

16. A pressure regulator according to claim 1, especially for steam operated plants, in which the impulse spaces and conduits are filled with water adapted to transmit the pressure impulses from the main conduit to the bellows.

HERMANN SANDVOSS.